United States Patent
Sato et al.

(10) Patent No.: US 8,419,913 B2
(45) Date of Patent: Apr. 16, 2013

(54) POROUS ELECTROCONDUCTIVE MATERIAL AND PROCESS FOR PRODUCTION THEREOF; ELECTRODE AND PROCESS FOR PRODUCTION THEREOF; FUEL CELL AND PROCESS FOR PRODUCTION THEREOF; AND ELECTRONIC INSTRUMENT, MOBILE MACHINE, ELECTRIC POWER GENERATING SYSTEM, COGENERATION SYSTEM, AND ELECTRODE REACTION-BASED APPARATUS

(75) Inventors: Atsushi Sato, Kanagawa (JP); Hideki Sakai, Kanagawa (JP); Mamoru Hatakeyama, Kanagawa (JP); Takaaki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 11/458,920

(22) Filed: Jul. 20, 2006

(65) Prior Publication Data

US 2007/0062821 A1    Mar. 22, 2007

(30) Foreign Application Priority Data

Jul. 27, 2005    (JP) ................. 2005-216808

(51) Int. Cl.
*C12Q 1/00* (2006.01)
(52) U.S. Cl.
USPC .......... 204/403.04; 204/403.09; 204/403.1; 204/403.14; 204/403.05; 502/7
(58) Field of Classification Search .............. None
See application file for complete search history.

(56) References Cited

U.S. PATENT DOCUMENTS

| | | | | |
|---|---|---|---|---|
| 3,874,856 A | * | 4/1975 | Leeds | 51/296 |
| 4,293,396 A | * | 10/1981 | Allen et al. | 205/533 |
| 4,929,391 A | * | 5/1990 | Kroupa | 252/511 |
| 4,970,145 A | * | 11/1990 | Bennetto et al. | 204/403.11 |
| 6,387,149 B1 | * | 5/2002 | Harada et al. | 75/239 |
| 6,428,722 B1 | * | 8/2002 | Furuya | 252/510 |
| 2003/0116503 A1 | * | 6/2003 | Wang et al. | 210/660 |
| 2004/0214053 A1 | | 10/2004 | Armstrong | |
| 2006/0105418 A1 | | 5/2006 | Sato et al. | |

FOREIGN PATENT DOCUMENTS

| | | | |
|---|---|---|---|
| JP | 58005642 A | * | 1/1983 |
| JP | 2000133297 | | 5/2000 |
| JP | 2002-145665 | | 5/2002 |
| JP | 2002-270209 | | 9/2002 |
| JP | 2003282124 | | 10/2003 |
| JP | 2004071559 | | 3/2004 |
| JP | 2004-165142 | | 6/2004 |
| JP | 2005-501387 | | 1/2005 |
| JP | 2005013210 | | 1/2005 |
| JP | 2006-234788 | | 9/2006 |

OTHER PUBLICATIONS

English translation of JP 58005642, published Jan. 13, 1983. Translation date: Mar. 5, 2010.*
JP Office Action for corresponding Japanese Patent Application No. 2005-216808 dated Aug. 23, 2011.
Japanese Office Action issued Jun. 19, 2012 for corresponding Japanese Appln. No. 2005-216808.

* cited by examiner

*Primary Examiner* — Allison Ford
*Assistant Examiner* — Susan E Fernandez
(74) *Attorney, Agent, or Firm* — K&L Gates LLP

(57) ABSTRACT

A porous electroconductive material is provided. The electroconductive material enables efficient enzymatic metabolic reactions on electrodes and yields electrodes having immobilized enzymes thereon which remain stable in any working environment. The porous electroconductive material, which has a three-dimensional network structure, is formed from a skeleton of porous material and a carbonaceous material covering the surface of the skeleton. The porous material constituting the skeleton is foamed metal or alloy. This porous electroconductive material is made into an electrode, and enzymes are immobilized on this electrode. The resulting electrode with immobilized enzymes thereon is used as the anode of a bio-fuel cell.

10 Claims, 9 Drawing Sheets

POROUS ELECTROCONDUCTIVE MATERIAL AND PROCESS FOR PRODUCTION THEREOF; ELECTRODE AND PROCESS FOR PRODUCTION THEREOF; FUEL CELL AND PROCESS FOR PRODUCTION THEREOF; AND ELECTRONIC INSTRUMENT, MOBILE MACHINE, ELECTRIC POWER GENERATING SYSTEM, COGENERATION SYSTEM, AND ELECTRODE REACTION-BASED APPARATUS

CROSS REFERENCES TO RELATED APPLICATIONS

The present application claims priority to Japanese Patent Application JP 2005-216808 filed in the Japanese Patent Office on Jul. 27, 2005, the entire contents of which being incorporated herein by reference.

BACKGROUND

Metabolism in a living body is an extremely efficient reaction with a high substrate specificity which proceeds in a comparatively mild environment (neutral at room temperature). Such metabolism includes respiration and photosynthesis that converts nutrients (such as oxygen, saccharides, fats, and proteins) into energy required for growth of microbes and cells.

Biocatalysts (or enzymes) composed of proteins get deeply involved in such reactions in a living body. The idea of utilizing the catalytic action of enzymes had been put to practice in the long human history. The application of enzymes covers various fields such as brewing industry, fermentation industry, textile industry, leather industry, food industry, and pharmaceutical industry. Enzymes are expected to find new uses in the field of electronics, such as biosensors, bioreactors, and bio-fuel cells, which have electrodes catalyzed by enzymes.

Unfortunately, enzymes have been used exclusively in an aqueous medium because they are proteins which are unstable to heat, strong acid and alkali, and organic solvent. In the past, the enzymatic reaction has been carried out by the batchwise process that causes enzymes dissolved in an aqueous medium to react on the substrate. The batchwise process is uneconomical because it is repeated after enzymes have been discarded. In fact, it is very difficult to recover enzymes intact (for reuse) from reaction solutions.

To address this problem, there have been proposed immobilized enzymes, which are insoluble in water. Immobilized enzymes (with high substrate specificity) can be used in the same way as solid catalysts for ordinary chemical reactions. Immobilization is a highly effective way of using enzymes.

The same is true for the application of enzymes to electrodes. Enzymes densely immobilized on the surface of an electrode produce enzymatic reactions near the electrode and such enzymatic reactions can be detected as electric signals. Incidentally, an electron mediator (or electron acceptor) is necessary between the enzyme (protein) and the electrode to promote electron transfer, and this electron mediator should also be immobilized preferably.

There are generally two methods for immobilizing enzymes on electrodes—the entrapping method and the bonding method. Research is progressing on how to immobilize enzymes on various electrode materials.

According to the related arts, electrode materials which have preferentially been used for high reaction efficiency are carbonaceous porous ones with a large surface area. (See, Japanese Patent Laid-open Publication (JP-A) No. 2000-133297, JP-A No. 2003-282124, JP-A No. 2004-71559 and JP-A No. 2005-13210.) Carbonaceous porous electrode materials, however, have a very small pore diameter and are limited in porosity (which affects strength). Consequently, they prevent a solution (containing enzymes or substrate for reactions) from infiltrating into them, resulting in uneven distribution of enzymes and substrate. That is, the advantage of their high surface area has not been fully utilized. This problem is more serious when a highly viscous solution is used or the enzymatic reactions involve a large pH change. In these cases, the solution does not infiltrate into the inside and the buffering function does not follow the abrupt pH change in the electrode, which would lead to enzyme deactivation.

Much has been studied about immobilization of enzymes on carbonaceous materials as well as metallic materials such as titanium, copper, aluminum, nickel, stainless steel, chromium, gold, and platinum. (See, Japanese Patent Laid-open Publication (JP-A) No. 2000-133297, JP-A No. 2003-282124 and JP-A No. 2004-71559.) However, metallic materials are poor in stability (or liable to corrosion and dissolution depending on solution pH and potential) and inferior in surface area to carbonaceous materials.

Although carbonaceous materials as well as, metallic materials have been used as raw materials for electrodes on which enzymes are to be immobilized, they have their merits and demerits, as mentioned above.

It is desirable to provide a porous electroconductive material and a process for production thereof; an electrode made of the electroconductive material and a process for production thereof; a highly efficient fuel call equipped with the electrodes on which enzymes are immobilized and a process for production thereof; and an electrode reaction-based apparatus equipped with the electrodes having immobilized enzymes thereon the porous electroconductive material is characterized by adequate pore diameters (large enough for a solution containing the substrate to easily pass through), high porosity, high conductivity, and large surface areas. Moreover, the porous electroconductive material enables efficient enzymatic metabolic reactions on electrodes and yields electrodes having immobilized enzymes thereon which remain stable in any working environment.

It is further desirable to provide an electronic instrument, a mobile machine, an electric power generating system, and a cogeneration system, which are equipped with the highly efficient fuel cell.

SUMMARY

The present application relates to a porous electroconductive material and a process for production thereof; an electrode and a process for production thereof; a fuel call and a process for production thereof; and an electronic instrument, a mobile machine, an electric power generating system, a cogeneration system, and an electrode reaction-based apparatus. More particularly, the present application will find use as a fuel cell that works with the help of enzymes and a variety of instruments, apparatuses, and systems that utilize this fuel cell as their power source.

The first embodiment is directed to a porous electroconductive material which includes a skeleton of porous material and a material composed mainly of carbonaceous material which covers at least part of the skeleton.

The second embodiment is directed to a process for producing a porous electroconductive material, the process comprising a step of coating the surface of a skeleton of porous material at least partly with a material composed mainly of carbonaceous material.

In the first and second embodiments, the porous material constituting the skeleton of the porous electroconductive material is not restricted (particularly in conductivity) so long as it has high porosity and is capable of stably maintaining the skeleton. The porous electroconductive material to be used as the electrode on which enzymes are to be immobilized should preferably have high porosity and high conductivity. Such porous materials (with high porosity and high conductivity) includes, for example, metallic materials (metals and alloys) and carbonaceous materials (with reinforced skeletons). Metallic materials as the porous materials may be selected from among many candidates such as nickel, copper, silver, gold, nickel-chrome alloy, and stainless steel (in the form of foamed metal or alloy). Selection depends on the solution pH and potential that vary according to the environment in which they are used. Porous materials (in addition to the above-mentioned metallic and carbonaceous materials) include spongy resinous materials. These porous materials should have adequate porosity and pore diameter (or minimum pore diameter) which are determined by the thickness of the carbonaceous material to be applied to the skeletons of the porous material and also by the porosity and pore diameter required of the porous electroconductive material. The pore diameter of the porous material is usually 10 nm to 1 mm, typically 10 nm to 600 □m.

On the other hand, the material that covers the skeleton is not specifically restricted so long as it has electroconductivity. The porous electroconductive material that is used as electrodes (particularly those on which enzymes are immobilized) should have adequate electroconductivity and stability at the expected potential. Such materials are selected from those which are composed mainly of carbonaceous materials. The carbonaceous materials are usually have a wide potential window and are chemically stable. The material composed mainly of carbonaceous material may be one which is composed solely of carbonaceous material or one which is composed mainly of carbonaceous material and a small amount of secondary material which is selected according to the characteristic properties required of the porous electroconductive material. Examples of the second material include carbonaceous materials incorporated with a highly electroconductive material (such as metal) which enhances electroconductivity and carbonaceous materials incorporated with polytetrafluoroethylene which imparts water repellency (other than electroconductivity). The carbonaceous materials are not specifically restricted; they may be carbon in the form of simple substance or a mixture of carbon with other elements. The carbonaceous material should preferably be in the form of fine powder having large surface areas and high electroconductivity. Examples of such carbonaceous materials include a carbon black such as Ketjenblack (with high electroconductivity) and functional carbonaceous materials (such as carbon nanotube and fullerene). The material composed mainly of carbonaceous material may be applied to the skeleton of the porous material by any method using an adequate adhesive. The coating method is not specifically restricted.

The porous electroconductive material that is used for the electrode on which enzymes are to be immobilized should have an adequate pore diameter that permits easy passage of solutions containing the substrate. The pore diameter should be 9 nm to 1 mm, preferably 1 □m to 1 mm, more preferably 1 □m to 600 □m.

The partial coating of the skeleton of porous material with the material composed mainly of carbonaceous material should preferably be carried out such that pores communicate with one another, without the coating material clogging pores.

A third embodiment is directed to an electrode of porous electroconductive material comprising a skeleton of porous material and a material composed mainly of carbonaceous material which covers at least part of the skeleton.

A fourth embodiment is directed to a process for producing an electrode, the process comprising coating the surface of a skeleton of porous material at least partly with a material composed mainly of carbonaceous material, thereby forming a porous electroconductive material, and molding the porous electroconductive material into an electrode.

According to the third and fourth embodiments, an electrode with immobilized enzymes thereon can be obtained by immobilizing enzymes on the electrode of the porous electroconductive material.

What was mentioned above about the first and second aspects is applicable to the third and fourth aspects.

A fifth embodiment is directed to a fuel cell of the type having a cathode and an anode which face each other with a proton conductor between them, at least either of the cathode and the anode being an electrode with immobilized enzymes thereof, wherein the electrode with immobilized enzymes thereon is an electrode having enzymes immobilized thereon, the electrode being an electrode of porous electroconductive material comprising a skeleton of porous material and a material composed mainly of carbonaceous material which covers at least part of the skeleton.

A sixth embodiment is directed to a process for producing a fuel cell having a cathode and an anode which face each other with a proton conductor between them, at least either of the cathode and the anode being an electrode with immobilized enzymes thereon, the process comprising a step of coating the surface of a skeleton of porous material at least partly with a material composed mainly of carbonaceous material, thereby forming a porous electroconductive material, a step of molding the porous electroconductive material into an electrode, and a step of immobilizing enzymes on the electrode, thereby forming the electrode with immobilized enzymes thereon.

According to the fifth and sixth embodiments, the electrode with immobilized enzymes thereon should preferably also have an immobilized electron mediator. In the case where fuel is monosaccharide such as glucose, the preferred immobilized enzymes are an oxidase (which oxidizes and decomposes the monosaccharide) and a coenzyme oxidase (which returns to an oxidized form the coenzyme which has been reduced by the oxidase). The coenzyme oxidase generates electrons when the coenzyme is returned to the oxidized form and transfers electrons to the electrode through the electron mediator. The oxidase includes, for example, glucose dehydrogenase (GDH), the coenzyme includes, for example, nicotinamide adenine dinucleotide ($NAD^+$), and the coenzyme oxidase includes, for example, diaphorase (DI).

In the case where the fuel is a polysaccharide in a broad sense (which denotes all hydrocarbons, including such oligosaccharides as disaccharide, trisaccharide, and tetrasaccharide) that upon hydrolysis give rise to more than one molecule of saccharide, the above-mentioned oxidase, coenzyme oxidase, coenzyme, and electron mediator should preferably be supplemented with an immobilized enzyme which promotes hydrolysis of polysaccharides and gives rise to monosaccharides such as glucose. The polysaccharide includes, for example, starch, amylose, amylopectin, glycogen, cellulose, maltose, sucrose, and lactose. They are composed of more than one monosaccharide, and any of them contains glucose (monosaccharide) as the constituent unit. Amylose and amylopectin are components contained in starch (that is, starch is a mixture of amylose and amylopectin). In the case where glucoamylase is used as an enzyme to decompose polysaccharide and glucose dehydrogenase is used as an oxidase to decompose monosaccharides, any polysaccharide (such as starch, amylose, amylopectin, glycogen, and maltose) that is decomposed to glucose by glucoamylase can be used as the fuel for electric power generation. Incidentally, glucoamylase is an enzyme that hydrolyzes α-glucan to give glucose and glucohydrogenase is an enzyme to oxidize β-D-glucose into D-glucono-δ-lactone.

What was mentioned above about the first and second embodiments is applicable to the fifth and sixth aspects.

The fuel cell according to the fifth and sixth embodiments may be used for any machines and equipment that need electric power. It will find use in the fields of electronic instruments, mobile machines (such as automobile, motorcycle, aircraft, rocket, and spacecraft), power units, construction machines, machine tools, electric power generating systems, and cogeneration system. It varies in output, size, and shape and relies on different kinds of fuels depending on its usage.

A seventh embodiment is directed to an electronic instrument equipped with a fuel cell having a cathode and an anode which face each other with a proton conductor between them, at least either of the cathode and the anode being an electrode with immobilized enzymes thereon, wherein the electrode with immobilized enzymes thereon is an electrode having enzymes immobilized thereon, the electrode being an electrode of porous electroconductive material comprising a skeleton of porous material and a material composed mainly of carbonaceous material which covers at least part of the skeleton.

The electronic instruments according to the seventh embodiment include both portable ones and stationary ones. They include, for example, cellular phones, mobile instruments, robots, personal computers, game machines, on-vehicle equipment, household electric appliances, and industrial products.

What was mentioned above about the first to sixth aspects is applicable to the seventh aspect.

An eighth embodiment is directed to a mobile machine equipped with a fuel cell having a cathode and an anode which face each other with a proton conductor between them, at least either of the cathode and the anode being an electrode with immobilized enzymes thereon, wherein the electrode with immobilized enzymes thereon is an electrode having enzymes immobilized thereon, the electrode being an electrode of porous electroconductive material comprising a skeleton of porous material and a material composed mainly of carbonaceous material which covers at least part of the skeleton.

The mobile machine according to the eighth embodiment is not specifically restricted. It includes, for example, automobiles, motorcycles, aircraft, rockets, and spacecraft.

What was mentioned above about the first to sixth aspects is applicable to the eighth aspect.

A ninth embodiment is directed to an electric power generating system equipped with a fuel cell having a cathode and an anode which face each other with a proton conductor between them, at least either of the cathode and the anode being an electrode with immobilized enzymes thereon, wherein the electrode with immobilized enzymes thereon is an electrode having enzymes immobilized thereon, the electrode being an electrode of porous electroconductive material comprising a skeleton of porous material and a material composed mainly of carbonaceous material which covers at least part of the skeleton.

The electric power generating system according to the ninth embodiment is not restricted in its scale.

What was mentioned above about the first to sixth aspects is applicable to the ninth aspect.

A tenth embodiment is directed to a cogeneration system equipped with a fuel cell having a cathode and an anode which face each other with a proton conductor between them, at least either of the cathode and the anode being an electrode with immobilized enzymes thereon, wherein the electrode with immobilized enzymes is an electrode having enzymes immobilized thereon, the electrode being an electrode of porous electroconductive material comprising a skeleton of porous material and a material composed mainly of carbonaceous material which covers at least part of the skeleton.

What was mentioned above about the first to sixth embodiments is applicable to the tenth aspect.

An eleventh embodiment is directed to an electrode reaction-based apparatus utilizing at least one electrode with immobilized enzymes thereon, wherein the electrode with immobilized enzymes thereon is an electrode having enzymes immobilized thereon, the electrode being an electrode of porous electroconductive material comprising a skeleton of porous material and a material composed mainly of carbonaceous material which covers at least part of the skeleton.

What was mentioned above about the first to sixth embodiments is applicable to the eleventh aspect.

The present application, as described above covers a porous electroconductive material which includes a skeleton of porous material and a material composed mainly of carbonaceous material which covers at least part of the skeleton. The porous electroconductive material has sufficiently large pore diameters, high porosity, high conductivity, and sufficiently large surface areas. Consequently, it can be used as a material for electrodes on which enzymes are immobilized. It permits the electrode to take up the substrate and to discharge the by-product (detrimental to metabolism) through its pores. It also permits the passage of the buffer solution to ensure the buffering action that follows the abrupt pH change induced by metabolism. The electrode made of the porous electroconductive material is stable in any environment unlike metal electrodes, because the skeleton of the porous material is partly coated with a material composed mainly of carbonaceous material.

The described embodiments cover the electrode with immobilized enzymes thereon, the electrode permits the enzymatic metabolic reaction to take place thereon efficiently and stably in any environment. Moreover, the electrode may be used to construct efficient fuel cells and an electrode reaction-based apparatus. Such highly efficient fuel cells will help realize high-performance electronic instruments, mobile machines, electric power generating systems, and cogeneration systems.

Additional features and advantages are described herein, and will be apparent from, the following Detailed Description and the figures.

BRIEF DESCRIPTION OF THE FIGURES

Embodiments will be described in detail based on the following figures, wherein.

DETAILED DESCRIPTION

The embodiments will be described in more detail with reference to the accompanying drawings.

The first embodiment is concerned with the porous electroconductive material.

Figure 1A:
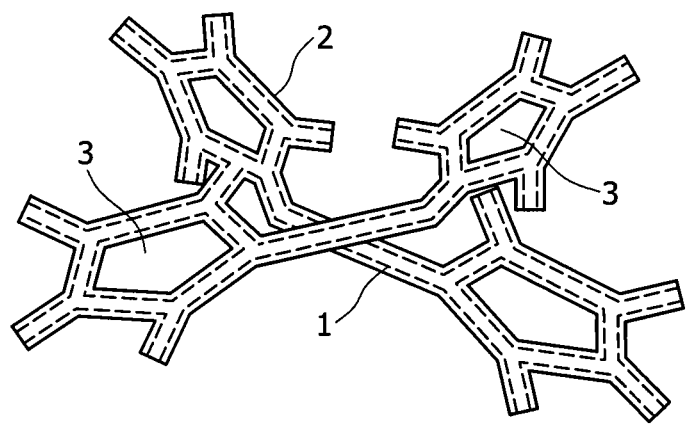
FIG. 1 is a schematic diagram and a sectional view illustrating the structure of the porous electroconductive material according to the first embodiment.
Figure 1B:
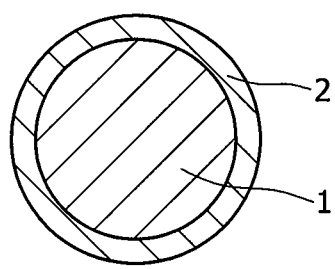

FIG. 1A schematically shows the structure of the porous electroconductive material, and FIG. 1B shows in section the skeleton of the porous electroconductive material. As shown in FIGS. 1A and 1B, the porous electroconductive material is composed of the skeleton 1 of porous material of three-dimensional network structure and the carbonaceous material 2 covering the surface of the skeleton 1. This porous electroconductive material has the three-dimensional network structure in which a large number of pores 3 surrounded by the carbonaceous material 2 form meshes. The carbonaceous material 2 is not specifically restricted in shape. It may take on fibrous (needlelike) form or granular form.

The skeleton 1 of the porous material may be formed from foamed metal or alloy (such as formed nickel). The porosity of the skeleton 1 is usually no less than 85%, preferably no less than 90%. The pore diameter of the skeleton 1 is usually 10 nm to 1 mm, preferably 10 nm to 600 μm, more preferably 1 to 600 μm, typically 50 to 300 μm, more typically 100 to 250 μm. The carbonaceous material should preferably be highly conductive material such as Ketjenblack. Other preferred examples include such functional carbonaceous materials as carbon nanotube and fullerene.

The porosity of the porous electroconductive material is usually no lower than 80%, preferably no less than 90%. The diameter of the pore 3 is usually 9 nm to 1 mm, preferably 9 nm to 600 μm, more preferably 1 to 600 μm, typically 30 to 400 μm, and more typically 80 to 230 μm.

The porous electroconductive material is produced in the following manner.

Figure 2A:
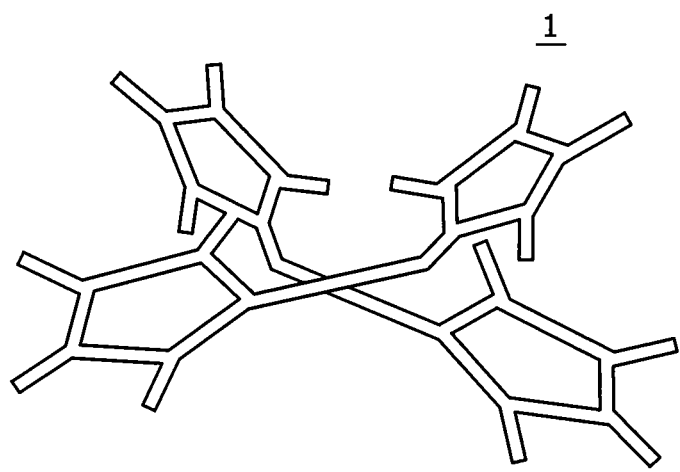
FIG. 2 is a schematic diagram illustrating the process for producing the electron conductive material according to the first embodiment.

First, the skeleton 1 is prepared from foamed metal or alloy (such as foamed nickel), as shown in FIG. 2A.

Figure 2B:
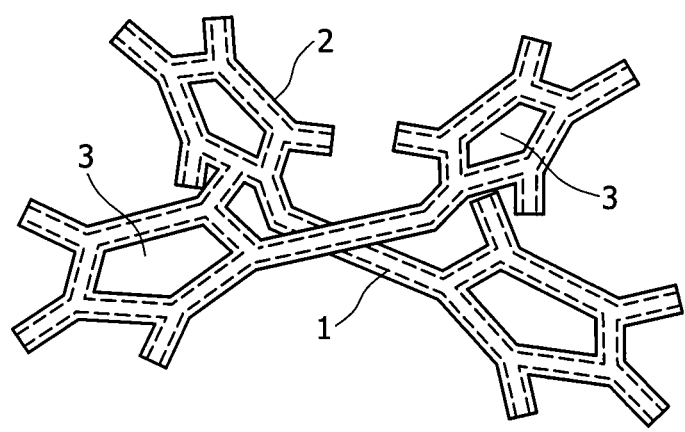

Then, the surface of the skeleton 1 made of foamed metal or alloy is coated with the carbonaceous material 2, as shown in FIG. 2B. This step may be accomplished by any known coating method, such as spraying of emulsion containing carbon powder and adequate adhesive. The coating thickness of the carbonaceous material 2 is determined by the porosity and pore diameter of the skeleton 1 made of foamed metal or alloy and also by the porosity and pore diameter required of the porous electroconductive material. Coating should be carried out such that a large number of pores 3 surrounded by the carbonaceous material 2 communicate with one another. In this way there is obtained the porous electroconductive material as desired.

The first embodiment yields the porous electroconductive material consisting of the skeleton 1 of foamed metal or alloy and the carbonaceous material 2 covering the surface of the skeleton 1. The resulting porous electroconductive material has a sufficiently large pore diameter 3 (due to rough three-dimensional network structure), high strength, high conductivity, and large surface area. This porous electroconductive material is made into an electrode, and the resulting electrode is covered with enzymes immobilized thereon. The resulting electrode with immobilized enzymes thereon enables efficient enzymatic metabolic reactions thereon or efficiently produces electric signals from the enzymatic reactions that take place in the neighborhood thereof. It is stable in any environment and suitable for bio-fuel cells.

In the second embodiment, the electrode which has been made of the porous electroconductive material in the first embodiment is covered with enzymes immobilized thereon. The electrode is also covered with an electron mediator and optional coenzyme and coenzyme oxidase.

The following description is concerned with an Example and Comparative Examples of the electrode with immobilized enzymes thereon.

Three kinds of electrodes (each measuring 10 mm long, 10 mm wide, and 2 mm thick) were prepared from porous carbonaceous material (in Comparative Example 1), foamed nickel (in Comparative Example 2), and carbon-coated foamed nickel (in the Example). Each electrode was coated with polygon complex film formed from a solution (applied dropwise) containing the following.

Glucose dehydrogenase (GDH) and diaphorase (DI) as enzymes.

Reduced nicotinamide adenin dinucleotide (NADH) as coenzyme.

2-methyl-3-carboxy-1,4-naphthoquinone (vitamin K3 (VK3)) as electron mediator.

1 wt % of poly-L-lysine (PLL) and 0.1 wt % of sodium polyacrylate (PAAcNa) as polymer support.

Figure 3:
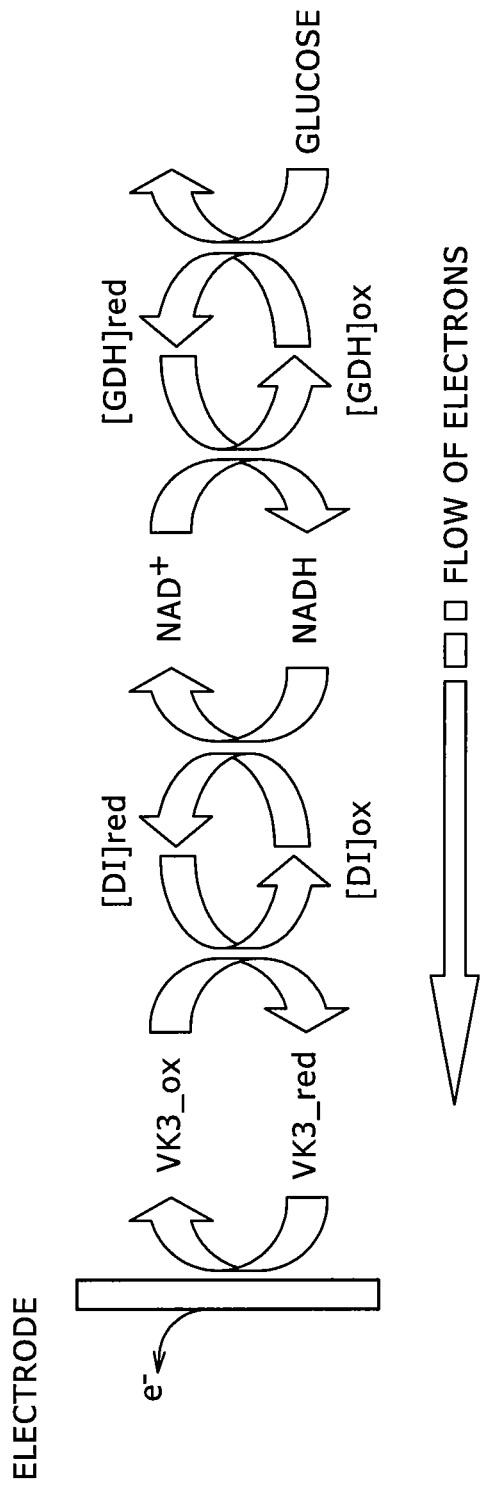
FIG. 3 is a schematic diagram illustrating the model of reaction mechanism for the electrochemical oxidation of glucose by glucose dehydrogenase on the electrode with immobilized enzymes thereon according to the second embodiment.

The resulting electrodes with immobilized enzymes thereon were tested for glucose metabolic capacity in terms of current value, with the glucose concentration being 400 mM. (Current-time curve at a constant potential of 0.1 V) FIG. 3 shows the flow of electrons in the glucose metabolism system involving the above-mentioned enzymes.

Figure 4:
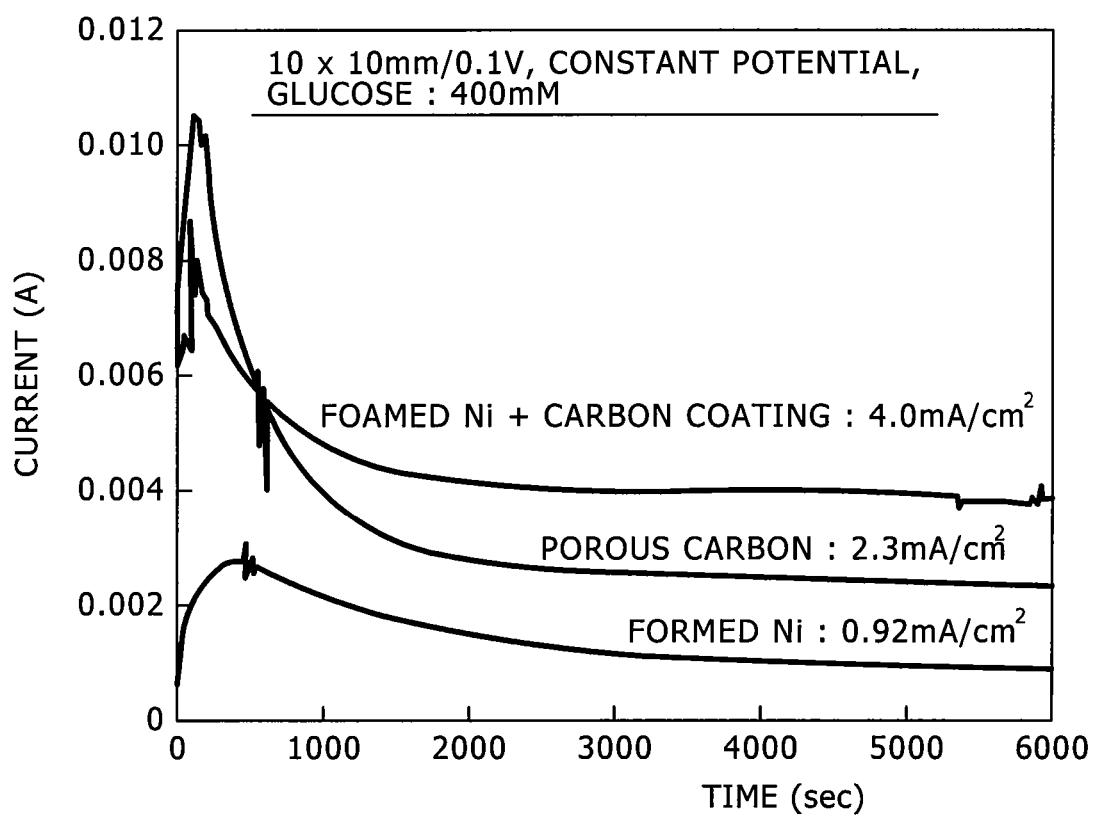
FIG. 4 is a schematic diagram illustrating the results of measurement of characteristic properties (at a constant potential of 0.1 V) of the electrode with immobilized enzymes thereon according to the second embodiment.

FIG. 4 is a diagram illustrating the current/time curve at a potential of 0.1 V. It is noted that the best electrode characteristics (for the same enzyme composition and amount) were obtained by the electrode in the Example (which is composed of foamed nickel and carbon coating). It is apparent from FIG. 4 that the electrode in Example produces four times as large current as the electrode of foamed nickel in Comparative Example 2 and twice as large current as the electrode of porous carbon in Comparative Example 1. This proves that the electrode in the Example is far superior to those in Comparative Examples 1 and 2.

Figure 5:
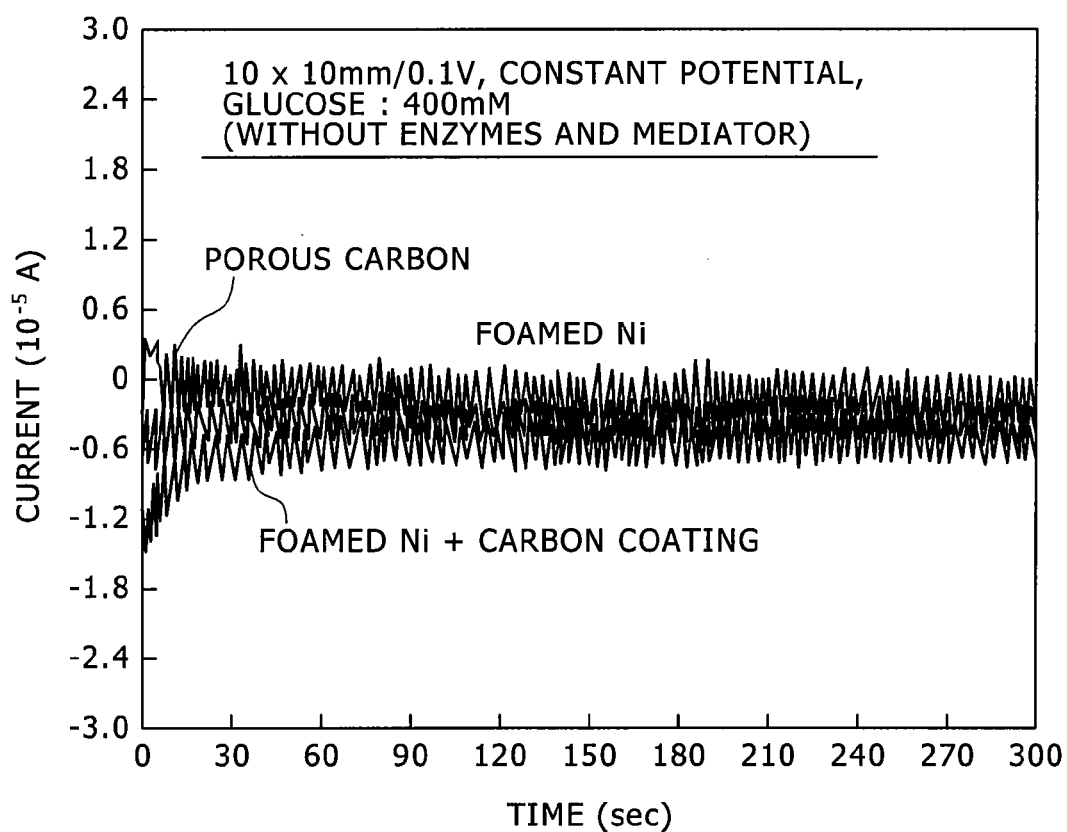
FIG. 5 is a schematic diagram illustrating the results of measurement of background current of the electrode with immobilized enzymes thereon according to the second embodiment.

FIG. 5 is a diagram showing the background current of the electrode alone (without enzyme, coenzyme, and electron mediator) in the Example and Comparative Examples 1 and 2. It is noted from FIG. 5 that the background current is less than a few microamperes regardless of the type of the electrode tested. (The electrode of foamed nickel with carbon coating in the Example; the electrode of foamed nickel in Comparative Example 1; and the electrode of porous carbon in Comparative Example 2). In other words, the background current is less than one-thousandth of the current shown in FIG. 4 (current/time curve). This suggests that the current produced is mostly due to enzymatic metabolism. Moreover, the fact that the three kinds of electrodes give almost the same background current suggests that the difference in current characteristics between the electrode in the Example and the electrodes in Comparative Examples 1 and 2 is not due to the electrode's inherent physical properties but due to the pore diameter and porosity that affect the enzymatic metabolism.

Figure 6:
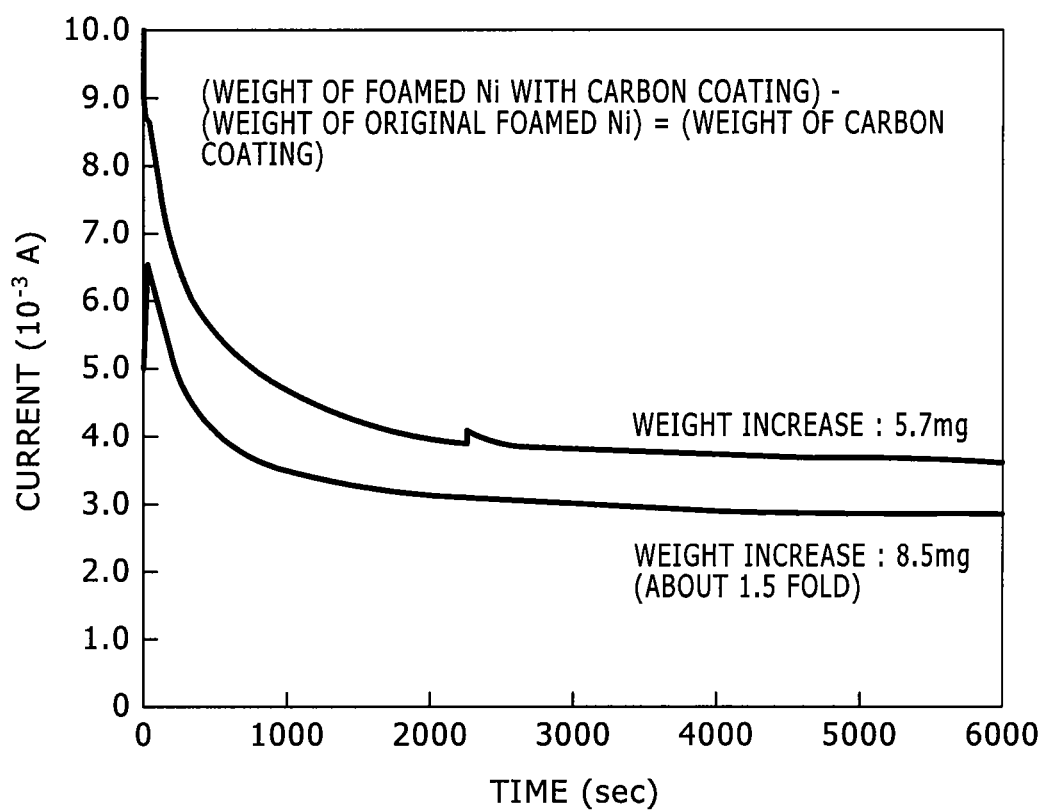
FIG. 6 is a schematic diagram illustrating the results of measurement of characteristic properties (at a constant potential of 0.1 V) of the electrode with immobilized enzymes thereon (with the amount of carbon coating varied) according to the second embodiment.

FIG. 6 is a diagram showing the current that varies depending on the amount of carbon coating on the electrode of foamed nickel with immobilized enzymes thereon. The amount of carbon coating is defined as the weight of carbon-coated electrode of foamed nickel minus the weight of the electrode of foamed nickel. It is noted from FIG. 6 that the current considerably decreases as the amount of carbon coating increases from 5.7 mg to 8.5 mg. In view of the fact that these electrodes with immobilized enzymes thereon are made of foamed nickel having almost the same pore diameter and porosity, the amount of carbon coating is proportional to the thickness of carbon coating film on the foamed nickel. The above-mentioned results suggest a decrease in porosity of the electrode with immobilized enzymes thereon.

Figure 7:
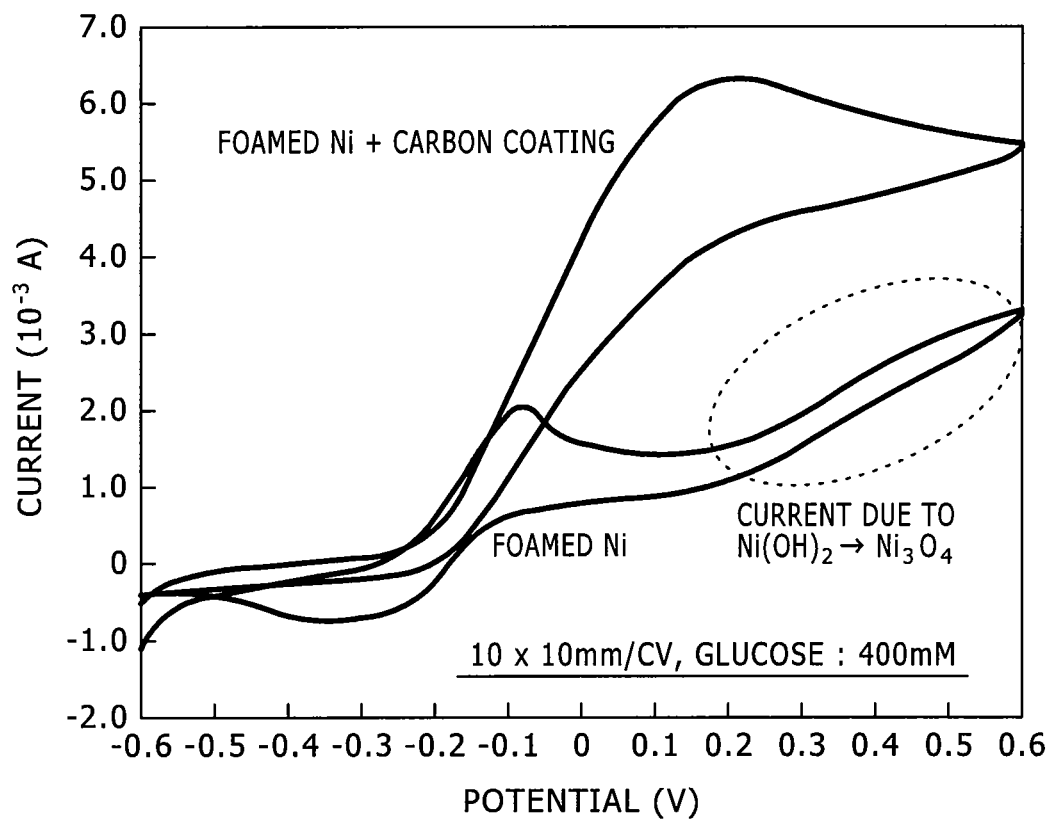
FIG. 7 is a schematic diagram illustrating the cyclic voltamogram of the electrode with immobilized enzymes thereon according to the second embodiment.

Electrodes with immobilized enzymes thereon were prepared in the same way as in the Example mentioned above. They were tested for cyclic voltammetry (CV). The results are shown in FIG. 7. It is noted from FIG. 7 that the electrode of foamed nickel with carbon coating (in the Example) is stable (owing to carbon coating) even at a high potential and produces a large catalysis current due to glucose metabolism, whereas the electrode of foamed nickel (in Comparative Example 2) produces an oxidation current due to metallic nickel at a high potential (higher than 0.2 V in FIG. 7) in addition to the catalysis current due to glucose metabolism. This suggests that the kind of metal used for the electrode and the environment of operation affect the state of immobilized enzymes as well as the stability of the electrode.

The following is concerned with the third embodiment which demonstrates a bio-fuel cell in which the anode has immobilized enzymes thereon.

Figure 8:
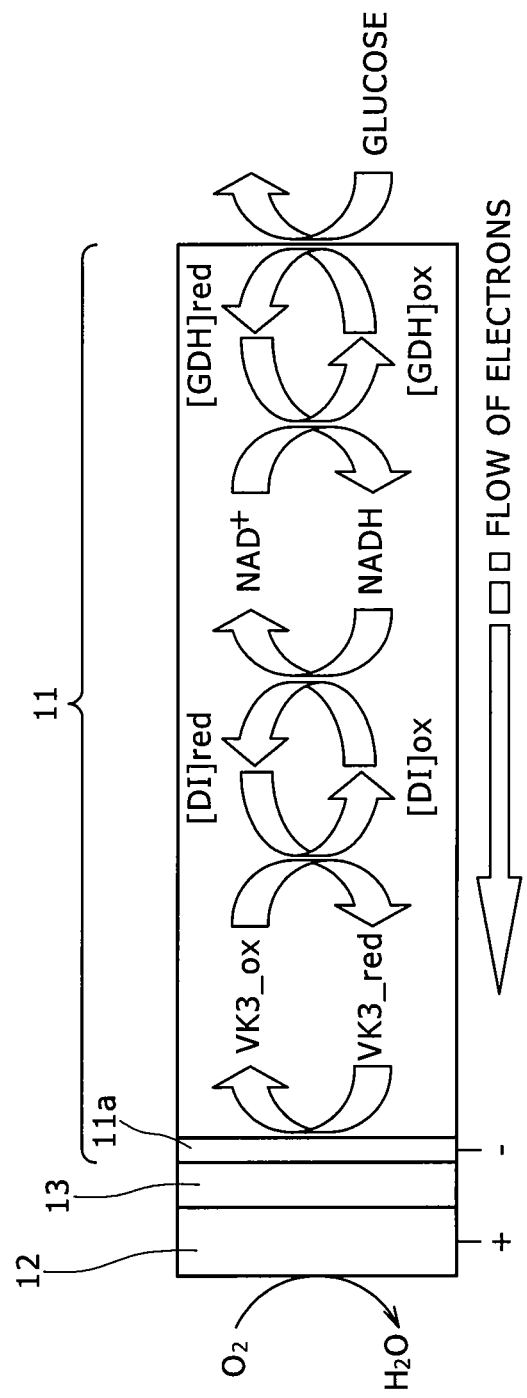
FIG. 8 is a schematic diagram illustrating the bio-fuel cell according to the third embodiment.

FIG. 8 shows the bio-fuel cell, which is composed of the anode 11 and the cathode 12, which face each other with the proton conductor interposed between them. The bio-fuel cell uses glucose solution as fuel.

The bio-fuel cell works in the following manner. First, the anode 11 is supplied with glucose solution. The glucose is decomposed by glucose dehydrogenase (GDH). This decomposition process (involving oxidation) reduces $NAD^+$ to produce NADH, and the NADH subsequently separates into two electrons, $NAD^+$, and $H^+$ through oxidation by diaphorase (DI). In other words, one molecule of glucose yields two electrons and two protons ($H^+$) through one stage of oxidation reaction. Therefore, in two stages of oxidation reaction, there occur four electrons and four protons ($H^+$). The resulting electrons move to the electrode 11a and further move to the cathode 12 through the proton conductor 13. On the cathode 12, the proton ($H^+$) reacts with oxygen (supplied from the outside) and electrons (supplied from the anode 11 through the external circuit) to give $H_2O$.

The anode 11 is composed of the electrode 11a and immobilized enzymes thereon. The electrode 11a is formed from the electroconductive material according to the first embodiment. To be concrete, it is foamed metal or alloy (such as foamed nickel) with carbon coating. The immobilized enzymes on the electrode 11a are glucose dehydrogenase (GDH) and diaphorase (DI) as enzymes, NADH as coenzyme, and VK3 as electron mediator, which are immobilized by means of polygon complex film.

The glucose dehydrogenase, diaphorase, NADH, and electron mediator should preferably be kept at a certain pH value (e.g., about pH 7) suitable for them by means of buffer solution (such as tris buffer solution and phosphate buffer solution) so that the electrode reaction proceeds efficiently and constantly. The ionic strength (I.S.) should preferably be about 0.3 in consideration of electrochemical responsiveness. An excessively high or low ionic strength adversely affects the enzyme activity.

The cathode 12 is formed from carbon powder carrying a catalyst or from catalyst particles not supported by carbon. The catalyst may be fine particles of platinum (Pt) or fine particles of transition metal, such as iron (Fe), nickel (Ni), cobalt (Co), and ruthenium (Ru), in the form of oxide or alloy with platinum. The cathode 12 is of laminate structure composed of a catalyst layer and a gas diffusion layer. The catalyst layer (which is adjacent to the proton conductor 13) is made of catalyst or catalyst-containing carbon powder. The gas diffusion layer is made of porous carbonaceous material. The catalyst in the cathode 12 may be an oxygen reducing enzyme, which is exemplified by bilirubin oxidase. This enzyme may be used in combination with the electron mediator which transfers electrons from one electrode to another. The electron mediator includes, for example, hexacyanoferrate ion. The enzymes and electron mediator may be immobilized by means of poly-L-lysine (PLL) mentioned above, for example.

The proton conductor 13 is a proton conductive membrane to transfer $H^+$ (generated by the anode 11) to the cathode 12. It is made of a material which is not capable of transferring electrons but is capable of transferring $H^+$. The proton conductor 13 is a film formed from, for example, perfluorocarbonsulfonate (PFS) resin, trifluorostyrene derivative copolymer, polybenzimidazole impregnated with phosphoric acid, aromatic polyetherketone sulfonic acid, PSSA-PVA (polystyrenesulfonic acid-polyvinyl alcohol) copolymer, and PSSA-EVOH (polystyrenesulfonic acid-ethylene vinyl alcohol) copolymer. Preferable among these examples is ion-exchange resin having fluorine-containing carbonsulfonic acid groups, which is commercially available under a trade name of Nafion (from DuPont).

Figure 9A:
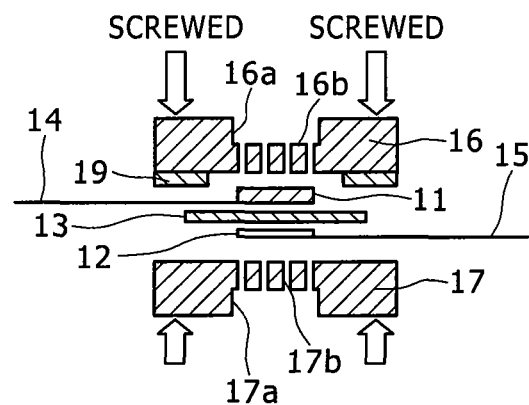
FIG. 9 is a schematic diagram illustrating the constitution of the bio-fuel cell according to the third embodiment.
Figure 9B:
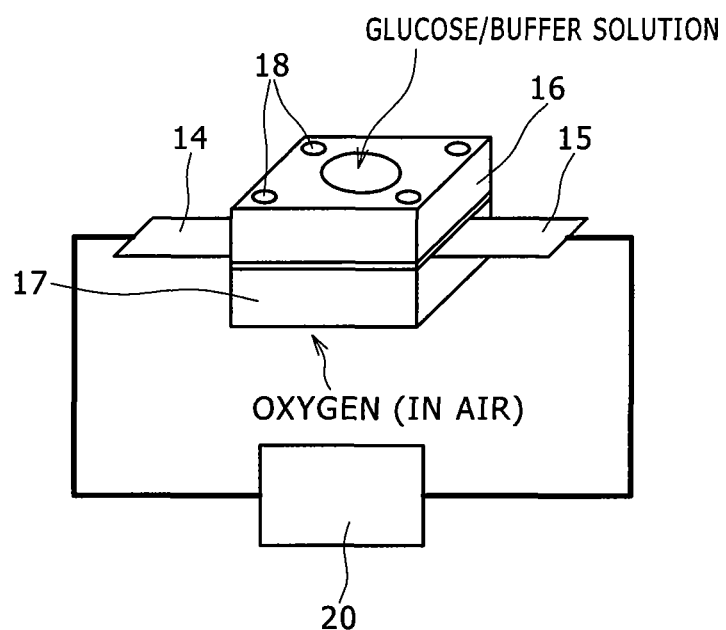

FIGS. 9A and 9B show a typical example of the bio-fuel cell. FIG. 9A shows the disassembled constituents of the bio-fuel cell. FIG. 9B is a perspective view of the assembled bio-fuel cell. As shown in FIGS. 9A and 9B, the bio-fuel cell has the current collectors 14 and 15 above and under the proton conductor 13. This structure facilitates current collection. There are shown stationary plates 16 and 17, which are fastened to each other by the screws 18. Between the stationary plates 16 and 17 are held the anode 11, cathode 12, proton conductor 13, and current collectors 14 and 15. The stationary plate 16 has a circular recess 16a (to be filled with fuel) formed on its outer side. This recess has at its bottom a number of holes 16b that pass through it. These holes 16b function as the fuel feeder for the anode 11. The stationary plate 17 also has a circular recess 17a (for air supply) on its outer side. This recess 17a has at its bottom a number of holes 17b that pass through it. These holes 17b function as the air feeder for the cathode 12. The stationary plate 16 has a spacer 19 around its periphery. This spacer provides a prescribed distance between the stationary plates 16 and 17 when they are tightened each other. The space 19 is a silicone sheet.

The bio-fuel cell generates electric power when a load 10 is connected to the current connectors 14 and 15 and the holes 16a of the stationary plate 16 are supplied with glucose and buffer solution and the holes 17a of the stationary plate 17 are supplied with air or oxygen, as shown in FIG. 9B.

The bio-fuel cell according to the third embodiment is highly efficient because of the enzymatic metabolic reaction that takes place efficiently on the anode 11.

This bio-fuel cell will find use as a power source for various electronic instruments (including cellular phones) and any other apparatuses.

The following is concerned with the bio-fuel cell according to the fourth embodiment of the present invention.

This bio-fuel cell uses starch (polysaccharide) as fuel. For decomposition of starch into glucose, the anode 11 additionally has immobilized glucoamylase thereon.

This bio-fuel cell works as follows. First, the anode 11 is supplied with starch as fuel. Then, this starch is hydrolyzed into glucose by the glucoamylase, and the resulting glucose is decomposed by the glucose dehydrogenase. The oxidation reaction involved in the decomposition process reduces $NAD^+$ into NADH, and the resulting NADH is oxidized by diaphorase for separation into two electrons, $NAD^+$, and $H^+$. In other words, one molecule of glucose yields two electrons and two protons ($H^+$) in a single stage of oxidation reaction. The oxidation reactions in two stages yield four electrons and four protons ($H^+$). The thus generated electrons are transferred to the anode 11 (or the electrode 11a), and protons ($H^+$) move to the cathode 12 through the proton conductor 13. On the cathode 12, these protons ($H^+$) react with externally supplied oxygen and electrons supplied from the anode 11 through the external circuit, thereby giving rise to $H_2O$.

Except for the foregoing, the bio-fuel cell according to the fourth embodiment is identical with that according to the third embodiment. The fourth embodiment offers the same advantage as the third embodiment. In addition, starch as fuel generates more electric power than glucose as fuel.

It is to be understood that the invention is not limited to the specific embodiments thereof and it may be variously modified without departing from the spirit and scope thereof. The values, structure, constitution, shape, and material mentioned in the embodiments may be modified as required. For example, the third embodiment may be modified such that the porous electroconductive material according to the first embodiment is applied not only to the anode 11 (or the electrode 11a) but also to the cathode 12.

The invention is claimed as follows:

1. A porous electroconductive material comprising
a skeleton of an electrically conductive porous material,
one or more enzymes, and
a material composed mainly of a carbonaceous material which coats and is directly formed on at least substantial portions of the interior and exterior of the skeleton, and the material composed mainly of a carbonaceous material is coated to a thickness such that the pores of the skeleton communicate with one another without the material clogging the pores.

2. The porous electroconductive material according to claim 1, wherein the electrically conductive porous material is a metal, an alloy, or a carbonaceous material.

3. The porous electroconductive material according to claim 1, wherein the electrically conductive porous material is foamed metal or foamed alloy.

4. The porous electroconductive material according to claim 1, wherein the carbonaceous material is fullerene.

5. The porous electroconductive material according to claim 1, wherein the material composed mainly of the carbonaceous material also includes a secondary material that is a metal.

6. The porous electroconductive material according to claim 1, wherein the material composed mainly of the carbonaceous material also includes a secondary material that is water repellant.

7. The porous electroconductive material according to claim 6, wherein the secondary material is polytetrafluoroethylene.

8. The porous electroconductive material according to claim 1, wherein the carbonaceous material is of a fibrous and needlelike shape.

9. An electrode of porous electroconductive material comprising
a skeleton of an electrically conductive porous material,
one or more enzymes, and
a material composed mainly of carbonaceous material which coats and is directly formed on at least substantial portions of the interior and exterior of the skeleton, and the material composed mainly of a carbonaceous material is coated to a thickness such that the pores of the skeleton communicate with one another without the material clogging the pores.

10. A method of producing an electrode comprising:
coating at least substantial portions of the interior and exterior of the surface of a skeleton of an electrically conductive porous material with a material composed mainly of carbonaceous material, thereby forming a porous electroconductive material where the carbonaceous material is formed directly on the electrically conductive porous material,
immobilizing one or more enzymes on said porous electroconductive material, and
molding the porous electroconductive material into an electrode,
wherein the material composed mainly of carbonaceous material is coated to a thickness such that the pores of the skeleton communicate with one another without the material clogging the pores.

* * * * *